United States Patent [19]
Ripple

[11] 3,882,962
[45] May 13, 1975

[54] LOUDSPEAKER EQUIPMENT
[76] Inventor: Warren Ripple, 2839 Sterling La., Sarasota, Fla. 33581
[22] Filed: Oct. 3, 1973
[21] Appl. No.: 402,975

[52] U.S. Cl. ............................... 181/154; 181/148
[51] Int. Cl. ........................ H04r 1/28; G10k 13/00
[58] Field of Search ........ 181/31 B, 31 R, 154, 199, 181/148

[56] References Cited
UNITED STATES PATENTS

| | | | |
|---|---|---|---|
| 2,036,832 | 4/1936 | Scheldorf | 181/31 B |
| 2,060,666 | 11/1936 | Ellmore | 181/31 B |
| 3,113,633 | 12/1963 | Eberhardt et al. | 181/31 B |
| 3,768,589 | 10/1973 | Nilsson et al. | 181/31 B |

FOREIGN PATENTS OR APPLICATIONS

| L21,465 | 11/1956 | Germany | 181/31 B |
|---|---|---|---|

Primary Examiner—Stephen J. Tomsky
Attorney, Agent, or Firm—Synnestvedt & Lechner

[57] ABSTRACT

Loudspeaker equipment especially adapted for use in an automobile and having a speaker enclosure comprising two interconnected chambers one of which is thin or shallow and is adapted to fit under an automobile seat, and the other of which is enlarged and accommodates a speaker, for instance a cone type speaker positioned with its axis extended upwardly. The walls of the speaker enclosure are constructed of sheet material such as thin plywood and the enclosure is substantially imperforate except for the speaker opening, to provide a resonant chamber adapted to accentuate the reproduction of sound at the bass end of the audio spectrum.

3 Claims, 3 Drawing Figures

PATENTED MAY 13 1975 3,882,962

LOUDSPEAKER EQUIPMENT

This invention relates to loud speaker equipment and while the speaker equipment of the invention may be employed in a variety of positions and under various conditions, it is particularly adapted for use in automobiles. The arrangement of the invention is therefore described herein in relation to its use in an automobile.

One of the objects of the invention is to provide speaker equipment adapted to be accommodated in part, underneath an automobile seat, particularly the front seat. At the same time, the invention contemplates speaker equipment adapted to contribute a source of sound radiation in the automobile originating at the region just in front of the automobile seat, which provides a desirable acoustical effect in the interior of the automobile, especially when my improved speaker equipment is used in combination with one or more other speakers in the automobile, such as those commonly provided either above the dashboard of the automobile or in the deck to the rear of the rear seat of the automobile.

Another object of the invention is to provide speaker equipment of the general kind referred to above having a speaker enclosure constructed to accentuate bass response, and thereby overcome a deficiency which is commonly present in speaker installations in automobiles in which the bass response frequently is inadequate.

How the foregoing and other objects and advantages are attained will be clear from the following description referring to the accompanying drawings in which.

Figure 1:
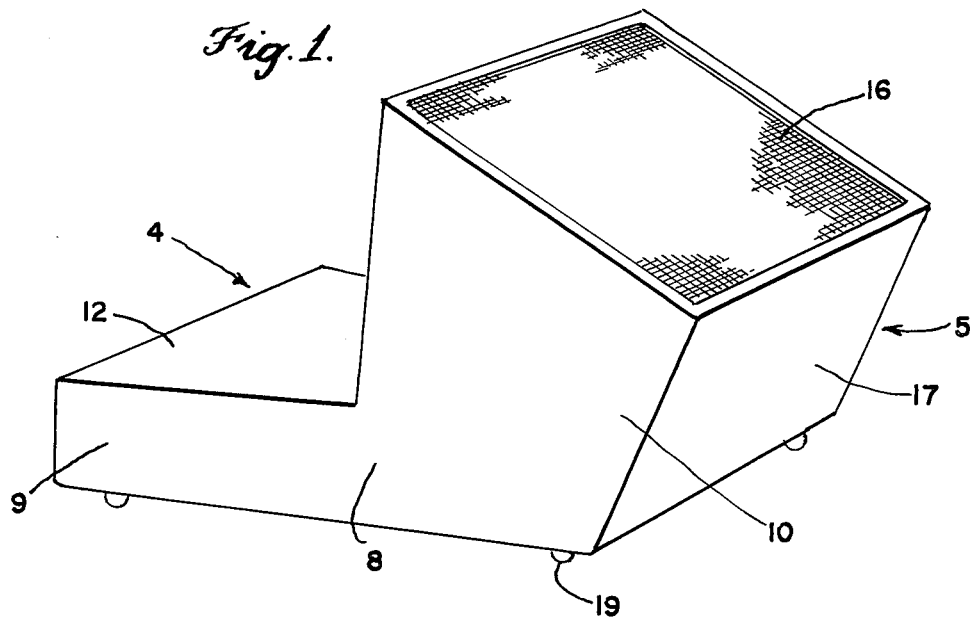
FIG. 1 is a perspective view of a speaker enclosure constructed according to the present invention.
Figure 2:
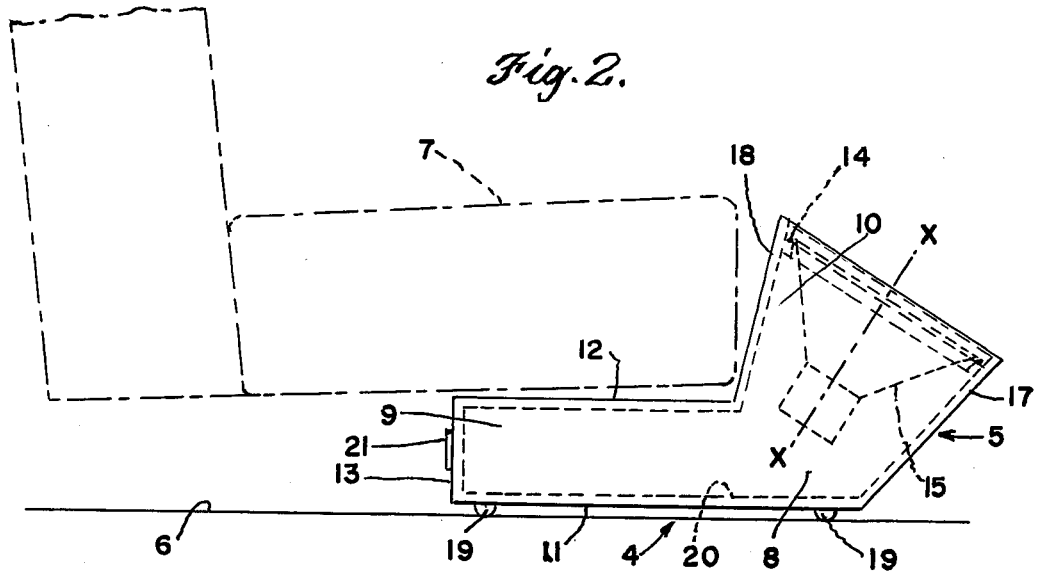
FIG. 2 is a side elevational view of speaker equipment according to the invention, indicating the location of the speaker within the enclosure and further indicating the position of the equipment in relation to the seat of an automobile.
Figure 3:
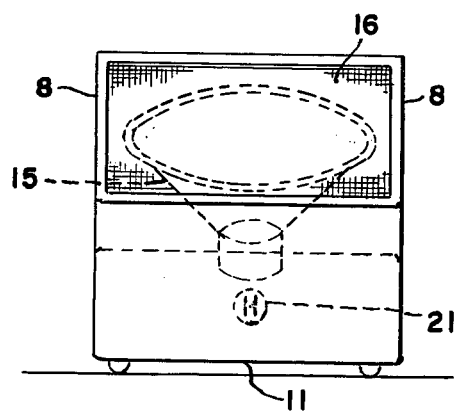
FIG. 3 is a right-hand end view of the speaker equipment as shown in FIG. 2.

As above indicated, the speaker enclosure employed according to the present invention, comprises two chambers or compartments which are interconnected and which communicate with each other. One of these chambers is indicated in general in FIG. 1 by the numeral 4 and the other is indicated in general by the numeral 5. Chamber 4 is relatively shallow having a relatively small vertical dimension but having some appreciable length so that it may be accommodated under the front portion of the front seat of an automobile, in the manner illustrated in FIG. 2. In FIG. 2 the floor of the automobile is indicated at 6 and the front seat at 7.

When positioned as shown in FIG. 2 it will also be seen that the enlarged end of the speaker enclosure is positioned to the front of the seat 7.

The two chambers of the speaker are defined by various surfaces or walls described more fully below, but the chamber 4 is, in general, of shallow and long shape, whereas, in general, the chamber 5 comprises a hexahedron which is joined to one end of the first portion.

In making up the speaker various wall elements are employed including a pair of parallel and spaced side wall elements 8, each of which has a strip-like portion 9, defining the side walls of the shallow chamber 4, and each of which further has a generally quadrilateral portion, 10, defining two of the side walls of the enlarged chamber 5.

A bottom wall 11 interconnects the lower edges of the side wall elements 8. Another wall element 12 interconnects the upper edges of the strip-like portion 9 of the side walls, and a back wall element 13 completes the rear end of the enclosure.

A wall element serving also as a speaker mounting is indicated at 14, this element being positioned to interconnect or bridge the space between the edges of the quadrilateral portions of the side walls remote from the striplike portions. The element 14 is apertured to cooperate with the speaker cone indicated at 15 which is enclosed within the enlarged chamber 5 of the enclosure in a position having its axis $x-x$ inclined upwardly and forwardly in relation to the shallow chamber 4 of the speaker and also in relation to the automobile seat 7. The speaker opening may be covered with a grille-cloth such as indicated at 16 in FIG. 1.

Still other wall elements 17 and 18 interconnecting pairs of edges of the enlarged chamber 5 serve to complete the speaker enclosure. Feet or pads 19 may be provided for support of the enclosure.

On the interior of the walls of the enclosure, it is contemplated to apply a fiberglass lining, as indicated by the dotted lines in FIG. 2 at 20.

In connection with the construction of the speaker enclosure it is contemplated to employ sheet material for the wall elements and while this sheet material may be of a variety of types, including plastic materials, it is preferred to employ a relatively thin plywood of the order of ⅛ inch thickness. The construction further contemplates that all of the joints be adhesively bonded, for instance with epoxy type adhesive. A "back-up" bead of glue or the like is advantageously provided inside of each seam or joint.

Although some openings could be provided in the enclosure, it is contemplated to provide an enclosure which is substantially imperforate, except for the opening through which the speaker is exposed for sound radiation. One reason for this is that the substantially completely closed enclosure provides a resonant chamber tending to accentuate bass response and reproduction, particularly below about 500 cycles. The construction of the enclosure with the two intercommunicating chambers 4 and 5 above described not only is of advantage from the standpoint of the use of the speaker equipment in an automobile (with the shallow portion accommodated under the seat, and with the enlarged portion positioned ahead of the seat with the speaker radiating upwardly), but is also of advantage in providing a chamber behind the speaker cone which aids in accentuating bass response over a substantial range of frequencies below about 500 cycles, without excessive accentuation at any one frequency only.

The speaker equipment may be arranged to accommodate speakers of various kinds and sizes, notably oval speakers of 5×7 inches or 7×9 inches dimensions. Speakers having round cones may also be accommodated but the oval-shaped speakers lend themselves well to accommodation within the confines of the hexahedron chamber 5 of the equipment, without making this chamber so large as to unduly encroach upon available space in the automobile.

The speaker equipment of this invention is advantageously used in combination with other speakers commonly provided in automobiles, and lends itself readily to cooperation with other speakers in stereo, or even in quadrasonic systems. For the latter purpose the speakers of the present invention may desirably be used in multiple. For whatever speaker connection is desired, it is contemplated to employ a plug receptacle connector 21, advantageously positioned at the rear end of the speaker chamber 4.

I claim:

1. Loudspeaker equipment comprising a speaker and a speaker enclosure, the enclosure having enclosure walls including walls defining a speaker chamber one end of which is generally rectangular and of relatively small vertical dimension in relation to its length and is adapted to be accommodated under an automobile seat, the upper and lower enclosure walls diverging to define an enlargement of the chamber at the other end thereof of relatively large dimension and having an opening presented upwardly and forwardly with respect to the automobile seat, and an apertured wall element in said opening with the speaker mounted thereon and exposed through the aperture in the wall and with its axis presented upwardly and forwardly with respect to the automobile seat.

2. Loudspeaker equipment as defined in claim 1 in which the chamber is defined by walls at least in large part formed of sheet material and said walls being substantially completely imperforate except for the speaker aperture.

3. Loudspeaker equipment as defined in claim 1 in which said walls comprise sheets of plywood of thickness of the order of ⅛ inch, the walls being bonded to each other at their meeting edges.

* * * * *